United States Patent [19]

Yall et al.

[11] 3,980,557

[45] Sept. 14, 1976

[54] PHOSPHORUS REMOVAL FROM WASTEWATER

[75] Inventors: Irving Yall; Norval Arthur Sinclair; Frank Andrew Roinestad; Charles Francis Russ, all of Tucson, Ariz.

[73] Assignee: University Patents, Inc., Stamford, Conn. 06905

[22] Filed: Dec. 18, 1974

[21] Appl. No.: 534,083

[52] U.S. Cl.................................... 210/15; 195/2
[51] Int. Cl.². ........................................ C02B 1/06
[58] Field of Search ............... 195/2, 96; 210/2, 11, 210/15

[56] References Cited
UNITED STATES PATENTS

| | | | |
|---|---|---|---|
| 3,386,910 | 6/1968 | Forrest | 210/11 X |
| 3,398,088 | 9/1968 | Okey | 210/11 X |
| 3,764,524 | 10/1973 | Stankewich | 210/11 X |

*Primary Examiner*—Thomas G. Wyse
*Attorney, Agent, or Firm*—Merriam, Marshall, Shapiro & Klose

[57] ABSTRACT

Disclosed are methods and materials, involving the microorganism *Acinetobacter phosphadevorus* (NRRL B-8058), useful in the removal of phosphorus from waste water.

15 Claims, No Drawings

PHOSPHORUS REMOVAL FROM WASTEWATER

BACKGROUND OF THE INVENTION

The present invention relates generally to the removal of phosphorus from waste waters and more particularly to methods and materials, involving the microorganism *Acinetobacter phosphadevorus* (NRRL B-8058), providing effective removal of phosphorus in sewage within the framework of available activated sludge treatment systems.

The presence of large amounts of phosphorus-containing compounds, particularly orthophosphates, in sewage and other waste waters is believed to be partially responsible for eutrophication, through uncontrolled growth of algae, of lakes and waterways throughout the world. [See, e.g., Hammond, A. E., *Science* 172, pp. 361–3 (1971).] Control of phosphorus levels of below 0.5 milligrams of orthophosphate per liter is generally believed necessary for the control of algal growth and it has been proposed that algal growth would almost cease if levels were controlled to below 0.05 milligrams per liter. [See, e.g., Nesbitt, J. B., *Jour. Water Poll. Control Fed.*, 41, No. 5, pp. 701–713 (1969).] Phosphorus is most frequently removed from waste waters through chemical treatment, activated sludge treatment, or through a combination of both.

Chemical treatment ordinarily involves ion exchange and/or precipitation of phosphorus with metal ions such as aluminum, iron, or calcium. A review of chemical treatment schemes may be found in Jenkins, D., et al., *Water Research*, 5, 369 (1971).

The sludge employed in activated sludge systems is a sticky, muddy, brown to black mass of biological components such as bacteria, protozoa, and algae, as well as non-biological components such as organic products and inorganic materials, which forms naturally when waste water is aerated in tanks. In most treatment plants, sludge effectively rids the waste water of carbon compounds and potentially infectious bacteria, but does a rather poor job in removing phosphorus pollutants. Many sludges which can provide organic removals of 90 to 95% will take up phosphate at a rate of less than 1 milligram per liter per hour.

Activated sludge treatment schemes asserted to provide enhanced capability for removal of phosphorus are quite varied. U.S. Pat. No. 3,654,146, which itself relates to an activated sludge method involving "starving" of sludge microorganisms, contains a rather complete review of many prior art methods, particularly those of U.S. Pat. Nos. 3,236,766, 3,385,785, 3,390,077 and 3,522,171. The proposed schemes, if they are effectively practiced, ordinarily substantially increase the overall cost of waste water treatment either because of special apparatus or special chemicals.

Within the last five to seven years it has been reported that sludges, termed "luxury" sludges, from plants located in five cities (San Antonio, Fort Worth, and Amarillo, Tex.; Baltimore, Md.; and Los Angeles, Calif.) in the United States had high affinities for phosphorus. (See, e.g., Withrow, J. L., *Proc. 24th Ind. Waste Conf.*, pp. 1169–84, Purdue University, Lafayette, Ind. (1969).)

Prior to the present invention, the mechanism by which sludges removed amounts of phosphorus in excess of their apparent metabolic requirements was subject to controversy, as evidenced by conflicting proposals and reports. With respect to the sludge of the Rilling Road plant in San Antonio, Tex., it was concluded in Menar, A. B., et al., *SERL Report*, 68–6, U. Cal. Berkley (1968) that the high phosphorus affinity shown by Rilling shown sludge not biological in nature. It was therein proposed that excess removal, above that required for cell synthesis, was controlled by pH and the presence of calcium ions ($Ca^{2+}$) in the waste water. Under proper conditions of pH, a precipitate of calcium phosphate would form followed by an enmeshing of the precipitate into the activated sludge floc. Subsequent settling of the sludge would result in apparent disappearance of the phosphate from the supernatant fluid and incorporation into the floc.

While it was variously proposed and reported that the mechanism of enhanced uptake was principally biological in nature, there was little elucidation of such proposals. There existed only limited information in the art concerning the role played by the various microbial components of activated sludge in phosphate uptake. Srinath, et al., *Water and Waste Treatment*, 11, pp. 410–416 (1967) reported investigations of the removal of radioactive phosphorus ($^{32}P$) from sewage by activated sludge, mixed bacterial cultures isolated from sludge, *Zoogloea, sp.*, and the protozoan *Epistylis sp.* It was therein concluded that removal of $^{32}P$ from sewage was due largely to vorticellid protozoa such as *Epistylis sp.* in sludge. While it was demonstrated that bacteria were responsible for uptake of some amount of $^{32}P$, since the bacteria remained dispersed in the medium, it was concluded that bacterial efficiency in removal was poor. Whether protozoa played a primary role in phosphorus removal or simply served as a means for concentrating phosphorus taken up by bacteria was unresolved in the reference.

Ongoing research by certain of the inventors and their co-workers revealed rather conclusively a biological basis for the enhanced capacity of Rilling plant sludge for phosphorus uptake. In their 1971 report for the Environmental Protection Agency, *Mechanisms of Biological Luxury Phosphate Uptake* (Water Pollution Control Research Series, 17010 DDQ 11/71) and in a companion publication, Boughton, W. H., et al., *Applied Microbiology*, 22, pp. 571–77 (1971), studies of metabolic factors affecting enhanced phosphorus uptake by Rilling sludge were reported. The disclosure of these references concerning metabolic factors is expressly incorporated by reference in this disclosure. Briefly stated, these two references showed that the Rilling (San Antonio, Tex.) sludge has the capability of removing all of the phosphate normally found in Tucson, Ariz. sewage (about 30 mg./l.) in less than 3 hours. Removal was independent of externally supplied sources of energy or ions, since added orthophosphate and $H_3{}^{32}PO_4$ radioactivity were readily removed from tap water, glass-distilled water, and deionized water. The uptake had an optimum temperature range (24° to 37°C.) and an optimum pH range (7.7 to 9.7). It was inhibited by $HgCl_2$, iodoacetic acid, p-chloromercuribenzoic acid, $NaN_3$, and 2,4-dinitrophenol$_3$. Uptake was inhibited by 1% NaCl but was not affected by 10–3 M. ethylenediaminetetraacetic acid.

The above-identified E.P.A. report concluded, however, that at least two types of enzyme systems or microbial populations existed which participated in the phosphorus uptake. The extensive bacterial survey therein reported was inconclusive in pinpointing any particular members of the bacterial population of Rilling sludge as responsible for the activity under study. A filamentous form, *Sphaerotilus natans*, was noted as having the best phosphorus affinity of those bacteria isolated, but its affinity could account for only about one tenth of the total sludge activity. It was therefore concluded that *S. natans* might be the primary phosphorus removing entity in a synergistic combination with one or more other microbial entities.

Further studies by certain of the inventors and their co-workers in attempting to ascertain the mechanism by which Rilling sludge removes phosphorus from its medium are reported in Yall, I., et al., "Logical Removal of Phosphorus," appearing at pp. 231–241 in Eckenfelder, W. W., et al., (ed.) *Applications of New Concepts of Physical-Chemical Wastewater Treatment*, Sept. 18–22, 1972 (Pergamon Press, Elmsford, N.Y. 1972).

Finally, in the 1973 doctoral dissertation of one of the co-inventors (Roinestad, F. A., "Volutin Accumulation by Activated Sludge Microorganisms," The University of Arizona, available through Dissertation Abstracts Int'l., No. 74–12, 437), there is reported the detection of a bacterium, designated "P-7", as one of seven elements within grape-like clusters of coccoid, gram-negative microorganisms in Rilling sludge. "P-7" was therein demonstrated, by staining studies, to have the capacity to form volutin (a granular complex of polyphosphate, RNA, proteins and lipids) in 21 kinds of common phosphate-containing media. The disclosure of the Roinestad dissertation is expressly incorporated by reference herein.

BRIEF SUMMARY

The present invention provides methods and materials useful in the removal of orthophosphate from wastewater, particularly sewage, through use of activated sludge wastewater treatment systems which have been "enhanced" in their phosphate removal capacity by the introduction of a cultured growth of the microorganism *Acinetobacter phosphadevorus* (NRRL B-8058) into the sludge in a manner which establishes the organism as an active, sustained-growth biological component thereof. According to the invention, therefore, existing and newly-initiated activated sludge sewage treatment systems may be provided with an enhanced capacity for removal of orthophosphate without further chemical of physical manipulation of the sludge system.

DETAILED DESCRIPTION

The microorganism *Acinetobacter phosphadevorus* ("P-7" of the Roinestad dissertation) is a Gram-negative bacterium having the following characteristics: rods very short and plump; coccoid in stationary phase usually about 1–2 μm in diameter; occurs predominantly in pairs; will frequently floc in liquid media; no spores formed; flagella not present; non-motile; capsules are frequently present; and, intracellular volutin inclusions are present as early as the exponential growth phase.

Lyophilized transfers of a culture of *Acinetobacter phosphadevorus* have been deposited with the United States Department of Agriculture, Agriculture Research Service, 1815 North University St., Peoria, Ill. 61604 and the microorganism has been given the identifying number NRRL B-8058. The organism shall be made permanently available to the public in accordance with the Apr. 29, 1971 Commissioner's Notice appearing at 886 O.G. 638.

Chemoorganotrophic with oxidative metabolism, the organism will grow on a simple salts medium (see, e.g., the acetate medium of Example I, infra) plus one of the following carbon sources: acetate, formate, propionate, citrate, succinate, glycerol, pyruvate, or malate. It will grow on any of the following L-Amino acids without an exogenous inorganic ammonia source: alanine, valine, leucine, isoleucine, serine, aspartate, asparagine, glutamate, glutamine, arginine, lysine, histidine, phenylalanine, tyrosine, proline, hydroxyproline. It will grow on tryptophan when the medium is enriched with $(NH_4)_2SO_4$. The organism will not grow on glycine, cysteine, methionine, or threonine. It cannot use glucose and the common hexose and pentose sugars as growth factors or sources of acid. It is oxidase negative and catalase positive. It does not produce indole, acetoin, or $H_2S$. It is a slow nitrate reducer and does not liquify gelatin. The organism will grow on chocolate agar or sheep blood agar plates without hemolysis. It is non-pathogenic for mice. It is a strict aerobe with an optimum temperature of about 25°–30°C. It has an optimum pH range between 7 and 8. It is resistant to Penicillin. It forms white colonies on agar, 2 to 3 mm. in diameter after 24 hours, usually smooth, mucoid, and adherent to the substrate.

As indicated by the above, cultures of the subject organism are readily grown in pure culture in the laboratory on media composed of inorganic salts and various carbon-containing compounds. The organism may be maintained on nutrient agar slants which are incubated for 48 hours at 25°C. after inoculation and stored at 5°C. for up to one month before transfer.

In its preferred forms, the present invention embraces not only the process of removing raw sewage orthophosphate through use of a sludge which has been inoculated with a cultured growth of *Acinetobacter phosphadevorus*, but also a number of related processes including enhancing the phosphorus removal capability of existing activated sludge treatment systems especially of the "continuous culture" type. As used herein, the term "continuous culture" includes sewage treatment systems wherein some amount of the activated sludge employed in the treatment of a given quantity of sewage is subsequently employed in the treatment of fresh, untreated (raw) sewage. As such, the term embraces both batch process, wherein some sludge remains in an aeration tank after removal of sludge-treated sewage to a settling tank, as well as continuous cyclic process as described in Example I, infra. Also provided by the present invention are activated sludge inoculant products which contain a cultured growth of *Acinetobacter phosphadevorus* and which are particularly useful in the practice of such methods. As used herein, the term "cultured growth" shall mean a population of a subject organism which has been derived by purposeful cultivation in a selected nutrient medium under controlled environmental conditions. As such, the term includes populations cultivated in an environment which is substantially free of concurrent growth of all other organisms, as well as such populations which are cultivated in an environment wherein one or more additional organisms may concurrently grow, but does not include such a population as may be found within a gross aggregate of organisms (e.g., an aliquot of activated sludge) which has developed naturally and without purposeful acts being performed to provide a selected nutrient medium or controlled environmental conditions which will in any way selectively enhance growth of the organism.

The present invention may be better understood through consideration of the following illustrative example of a pilot plant study.

EXAMPLE I

A. Preparation of glass and plastic ware.

Prior to the addition of the cells, all glass and plastic ware (polycarbonate) was acid washed by autoclaving in 0.1 N. HCl for 3 minutes and then allowing the solutions to cool before rinsing 3 times in distilled water. This serves the purpose of not only removing phosphates from the glassware, but aids in keeping the *Acinetobacter phosphadevorus* cells from forming pellicles in the centrifuge tubes and reduces the tendency of the cells to adhere to the sides of the flasks involved in the growth of the organisms.

B. Preparation of media.

1. Acetate broth.

| Component | Amount (mg.) |
|---|---|
| Sodium acetate | 678 |
| $(NH_4)_2SO_4$ | 150 |
| $K_2HPO_4$ | 215 |
| $MgSO_4 \cdot 7H_2O$ | 200 |
| KOH | 28 |

Distilled water was added to give a total volume of 1,000 ml. The medium has a final pH of 7.7. The acetate broth was dispensed into 500 ml. Erlenmeyer flasks in 100 ml. amounts. After stoppering with cotton plugs, the flasks and medium were sterilized by autoclaving for 15 minutes at 121°C.

2. Sterile Sewage.

Fresh raw sewage from the primary clarifier of the Tucson, Ariz., waste water treatment plant was stored in 5 gallon carboys at 5°C. in the dark until used (generally no more than 3 weeks). The sewage first was filtered under suction through 3 layers of 9.0 cm. Whatman No. 1 filter paper contained in a Buchner funnel in order to remove small debris. The sewage was next passed through Millipore membrane filters (HA, 0.45 μmpore size) with the aid of suction induced by a vacuum pump. This treatment removes most bacteria. However, microcysts of *Sphaerotilus* can pass through filters of this porosity so a final filtration was made using Gelman Metrecel membrane filters (type GA-8, pore size 0.2 μm). The final product was of a clear golden yellow color with a faint aroma of ammonia. The sterile sewage was dispensed aseptically in 100 ml. portions into sterile 500 ml. Erlenmeyer flasks stoppered with cotton plugs. The sterile sewage may be stored, prior to use, at 5°C. for a period not exceeding 24 hours.

C. Preparation of Cells.

*Acinetobacter phosphadevorus* cells from a nutrient agar slant were inoculated into a flask of acetate broth and incubated at 25°C. for 36 hours while shaking on a gyrorotary shaker. The cells were centrifuged at 21,000 × g. The supernatant phase was decanted and discarded. The cells were washed twice aseptically with cold, sterile, acetate broth by centrifugation. Finally, the cells were resuspended and inoculated into 6 flasks of acetate broth an incubated for 36 hours at 25°C. on a shaker. The cells were harvested as previously described except that they were washed twice with cold sterile sewage.

The harvested and washed cells were resuspended and inoculated into 12 500 ml. flasks, each containing 100 ml. of sterile sewage, and incubated for 36 hours at 25°C. on a shaker. The cells were harvested by centrifugation and washed in fresh cold sterile sewage. They were transferred then into a previously acid washed continuous culture apparatus containing 1200 ml. of sterile sewage.

D. Laboratory Scale Pilot Plant Operation.

The pilot plant was a continuous culture apparatus consisting of a medium reservoir of 4 liter capacity, an aeration chamber, and a settling tank. The organisms and sewage were divided evenly with 600 ml. in the settling tank and 600 ml. in the aeration chamber.

Fresh sterile sewage was prepared daily for a period of one week and placed in the reservoir. The sewage was delivered to the aeration chamber at the rate of 400 ml. per 8 hour period with the aid of a peristaltic pump. "Sludge" from the settling tank which did not receive aeration was delivered to the aeration chamber at the rate of 200 ml. every 8 hours. Material from the aeration chamber was drained into the settling tank at the rate of 600 ml. in 8 hours. Excess fluid, not returned to the aeration tank, was removed from the top of the settling tank at the rate of 400 ml. in 8 hours.

The system described was set up in tandem with a second control system which was identical to the *Acinetobacter phosphadevorus* system in every respect except that the organism was not included. The systems were aerated at the rate of 0.8 liters of air per minute.

After a period of one week, filtered raw sewage was substituted for sterile sewage. In about 2 weeks a sludge developed in the experimental system which contained *Acinetobacter phosphadevorus* and a variety of other microorganisms. *Acinetobacter phosphadevorus* persisted in the system for the duration of the experiment (140 days).

The amount of orthophosphate in the effluent from the *Acinetobacter phosphadevorus* system dropped from approximately 30 mg./liter to 4 mg./liter or approximately 87%. The sludge without *Acinetobacter phosphadevorus* in the control tank, removed about 2 mg./liter or only 6% of the orthophosphate present initially. The *Acinetobacter phosphadevorus* sludge consistently removed phosphorus (as orthophosphate) from the Tucson sewage as long as it received adequate aeration.

As may be noted from the above illustrative example, the present invention comprehends processes wherein newly-initiated continuous culture activated sludge sewage treatment systems are provided with *Acinetobacter phosphadevorus* as an active sustained-growth component of the sludge microbial mass. It is also contemplated that settling and/or aeration tanks of existing, actively operating, activated sludge treatment systems may be "seeded" with a cultured growth of *Acinetobacter phosphadevorus*, with the result that the microorganism will become incorporated in the existing sludge microbial system. The inoculant employed in such a procedure would preferably consist of a cultured growth of *Acinetobacter phosphadevorus* which has been cultivated in an aqueous, growth-supporting medium that is substantially devoid of bacterial or other biological growth. Such seeding procedures would be applicable to existing sludge systems which are completely devoid of *Acinetobacter phosphadevorus* growth as well as to systems which may be revealed to contain a population of *Acinetobacter phosphadevorus* within the sludge, but not an "effective population." As used herein, "effective population" refers to a relative population density of the organism which, in and of itself, will provide for removal of at least 50% of the orthophosphate present in raw sewage treated. Illustrative of a system containing *Acinetobacter phosphadevorus*, but not an effective population, may be the Tucson, Ariz., sewage treatment system. Because developmental work leading up to the invention has been carried out at The University of Arizona at Tucson for a number of years, it is likely that laboratory wastes containing *Acinetobacter phosphadevorus* have entered Tucson sewage and it is further likely that an exhaustive examination of activated sludge components in Tucson sewage treatment systems may reveal the presence of a population of *Acinetobacter phosphadevorus*. (It was noted, for example, in Yall, I., et al., supra, that bodies of organisms morphologically similar to those identified as "P-7" in Rilling sludge were found in Tucson sludge.) Tucson sludge, however, has exhibited no substantially enhanced phosphate removal capacity over the course of these years and such relative population density of *Acinetobacter phosphadevorus* as may exist in Tucson activated sludge systems would not be characterized as an effective population of the organism within the system.

As indicated in the example, the likelihood of incorporation of *Acinetobacter phosphadevorus* as an element of the sludge may be enhanced through an initial acclimation procedure which serves to permit the microorganism an opportunity to become "used to" significant growth-affecting components of an existing sludge sewage system. In this respect the preferred method involving acclimating a cultured growth of the microorganism in filtered, sterilized sewage has been illustrated, although it is expected that other acclimation procedures specifically geared to the nature of the sewage to be treated may also be employed. For example, it might only be necessary to acclimate *Acinetobacter phosphadevorus* to an aqueous medium substantially duplicating the existing pH level ordinarily found in the sewage to be treated, or existing nutritional medium factors.

The environmental conditions which appear to be optimal for phosphate uptake by *Acinetobacter phosphadevorus* were preliminary determined to be: 40 mg./l. carbon; 32 mg./l. nitrogen; 30 mg./l. phosphate; 20 mg./l. magnesium; 100 mg./l. sulfate; pH 7.5 to 8.0; and temperature, 24° to 30°C.

It is expected that the methods and materials will prove useful in converting existing sludge treatment systems having little to moderate phosphate removal capability into luxury sludge systems as above-described.

Obviously, modifications and variations of the above-described invention will occur to those of ordinary skill in the art upon consideration of the foregoing. It is expected, for example, that phosphate uptake activity of a sludge inoculated with a cultured growth of *Acinetobacter phosphadevorus* may be somewhat enhanced if the aeration procedures employed in the treatment system involved use of a gas which contains oxygen in greater proportions than normally occur in air, pure oxygen perhaps being most useful in such procedures. Therefore, only such limitations as appear in the claims should be placed upon our invention.

What is claimed is:

1. A process for enhancing the orthophosphate removal capacity of a continuous culture activated sludge sewage treatment system, said process comprising:
   introducing, into the sludge of the system, a bacterial inoculant comprising a cultured growth of the microorganism *Acinetobacter phosphadevorus* (NRRL B-8058).

2. The process of claim 1 wherein said inoculant comprises a suspension of a cultured growth of the microorganism *Acinetobacter phosphadevorus* (NRRL B-8058) in an aqueous growth-supporting medium substantially identical in non-biological component composition to the raw sewage to be treated in said system.

3. The process of claim 2 wherein said medium is sterilized sewage of the type to be treated.

4. A process for enhancing the orthophosphate removal capacity of a continuous culture activated sludge sewage treatment system not containing an effective population of the microorganism *Acinetobacter phosphadevorus* (NRRL B-8058), said process comprising:
   introducing, into the sludge of the system, a bacterial inoculant comprising a cultured growth of the microorganism *Acinetobacter phosphadevorus* (NRRL B-8058).

5. The process of claim 4 wherein said inoculant comprises a suspension of a cultured growth of the microorganism *Acinetobacter phosphadevorus* (NRRL B-8058) in an aqueous, growth-supporting medium substantially identical in non-biological component composition to the raw sewage to be treated in said system.

6. The process of claim 5 wherein said medium is sterilized sewage of the type to be treated.

7. A process for enhancing the orthophosphate removal capacity of a continuous culture activated sludge sewage treatment system, said process comprising, in sequence:
   acclimating a cultured growth of the microorganism *Acinetobacter phosphadevorus* (NRRL B-8058) to the ambient, bacterial-growth-affecting conditions of the particular raw sewage to be treated in said treatment system; and,
   introducing the resulting acclimated microorganism into the activated sludge of said treatment system.

8. The process of claim 7 wherein said acclimating step comprises introducing a cultured growth of said microorganism into an aqueous medium substantially identical in non-biological component composition to that of the raw sewage to be treated.

9. The process of claim 8 wherein said medium is sterilized sewage of the type to be treated.

10. The process of claim 9 further including aerating, with a gas containing oxygen, said sterilized sewage into which said microorganism has been introduced until said microorganism has adapted to the bacterial-growth-affecting conditions prevailing therein, as evidenced by substantially continuous growth and reproduction of said microorganism.

11. A process for removing orthophosphate from raw sewage, said process comprising:
    subjecting said raw sewage to continuous culture activated sludge treatment with a sludge containing a bacterial inoculant additive essentially consisting of a suspension of a cultured growth of the microorganism *Acinetobacter phosphadevorus* (NRRL B-8058), in an aqueous growth-supporting medium.

12. The process of claim 11 wherein said aqueous growth-supporting medium is substantially identical in non-biological component composition to the raw sewage to be treated.

13. The process of claim 12 wherein said medium is sterilized sewage of the type to be treated.

14. The process of claim 11 wherein said microorganism has been cultivated under conditions substantially devoid of other bacterial growth.

15. The process of claim 11 wherein said microorganism has been cultivated under conditions substantially devoid of other biological growth.

* * * * *